United States Patent [19]
Entwistle

[11] 3,742,618
[45] July 3, 1973

[54] FORWARD OBSERVER TRAINER
[75] Inventor: Robert J. Entwistle, Maitland, Fla.
[73] Assignee: The United States of America as represented by the Secretary of the Navy, Washington, D.C.
[22] Filed: Sept. 3, 1971
[21] Appl. No.: 177,734

[52] U.S. Cl. .................................. 35/25, 353/101
[51] Int. Cl. ............................................ F41g 11/00
[58] Field of Search ................... 35/25; 353/11, 30, 353/25, 101, 122; 350/160

[56] References Cited
UNITED STATES PATENTS

| | | | |
|---|---|---|---|
| 3,486,815 | 12/1969 | Roscoe | 353/11 |
| 3,191,490 | 6/1965 | Rabinow | 353/101 X |
| 2,431,824 | 12/1947 | Poch | 178/DIG. 29 |
| 2,418,512 | 4/1947 | Johnson | 35/25 |
| 2,502,834 | 4/1950 | Dreyer | 35/25 |
| 2,662,305 | 12/1953 | Alric | 35/25 |
| 3,608,212 | 9/1971 | Lenneryd et al. | 35/25 |

FOREIGN PATENTS OR APPLICATIONS
1,150,078  4/1969  Great Britain ....................... 353/30

*Primary Examiner*—Robert W. Michell
*Assistant Examiner*—J. H. Wolff
*Attorney*—Richard S. Sciascia, John W. Pease and John F. Miller

[57] ABSTRACT

Artillery shell and bomb bursts may be simulated using motion picture techniques by projecting bursts on a projected landscape. To simulate dark colored ground level bursts, a film bearing the image of a burst is moved into focus in the optical system of a landscape projector. Air bursts are simulated in the same way with the additional step of lighting a second film bearing a dust cloud image and which is permanently focused in the optical path of an auxiliary projector. The image projected by the auxiliary system is combined with that of the landscape projector to show an aerial burst having a dust cloud beneath it on the projected landscape.

4 Claims, 1 Drawing Figure

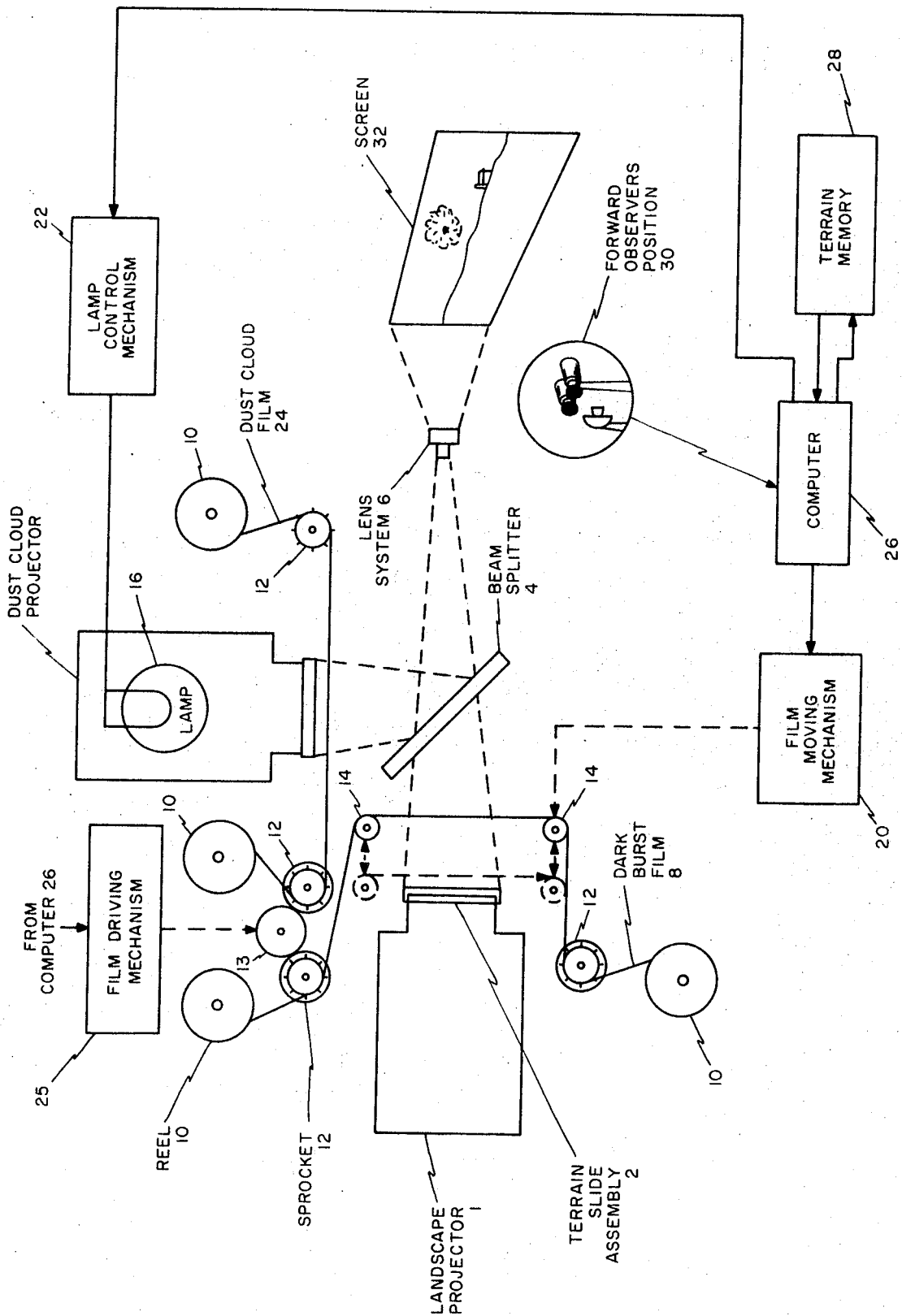

FORWARD OBSERVER TRAINER

BACKGROUND OF THE INVENTION

The invention is in the field of training devices. In prior art artillery and bombing training devices numerous efforts have been made to simulate shell bursts on a projected picture of a landscape having artillery and bomb targets located thereon. A visible shell burst locates the area hit by a gunner or bombardier, thus affording an immediate feedback of hit information to enable a forward observer trainee to submit corrective aiming information. Visible shell bursts also heighten the realism and thus the effectiveness of the training procedure. Prior art expedients include the projection of a colored light spot and a disintegrating aircraft silhouette (Dreyer, U.S. Pat. No. 2,502,834), tracer bullets (Johnson, U.S. Pat. No. 2,418,512), and a light spot (Daly, U.S. Pat. No. 2,417,354). Applicant overcomes the limitations of the prior art by realistically simulating shell bursts, both ground bursts and aerial bursts.

SUMMARY OF THE INVENTION

The invention is comprised of a pair of optical projectors having a common optical projection path, a shell (or bomb) burst film transporting mechanism, a dust cloud film transporting mechanism, means for moving the shell burst film in and out of focus, and dust cloud film lighting means. One projector projects a landscape on a screen. To simulate a ground level shell or bomb burst on the terrain represented by the projected landscape, a clear film bearing a dark colored shell burst image is quickly moved from an out-of-focus position into the focal plane of the landscape projector. An aerial burst is simulated by activating the ground level shell burst mechanism and additionally, activating a lighting and delayed dimming mechanism in the dust cloud film system to simulate a gradually dissipating dust cloud directly underneath the aerial burst.

The projectors and associated equipment are controlled by a computer which receives information from a forward observer's position and a terrain memory. The forward observer supplies azimuthal and elevation information for aiming a gun, bombs, etc. at targets on the projected landscape. The computer computes the location of a projected shell burst on the landscape and compares this with elevation information in the terrain memory to determine if a shell striking the particular location will produce a visible ground level burst, an aerial burst, or a burst which cannot be seen from a particular position, e.g., the forward observer's position.

DESCRIPTION OF THE DRAWING

The drawing illustrates the principles of the invention.

DESCRIPTION OF THE PREFERRED EMBODIMENT

The arrangement of projection and film transport mechanisms of the invention are shown diagrammatically in the drawing. A landscape projector 1 is equipped with a terrain slide assembly 2 and projects a landscape image through a beam splitter 4 and a projection lens system 6 (a part of projector 1) to a screen 32. A slide portraying a particular landscape is housed in terrain slide assembly 2. A shell burst film 8 stored on a pair of reels 10 is threaded over a pair of sprockets 12 and rollers 14 through the optical path of landscape projector 1. Shell burst film 8 is clear film except that it contains a black shell burst image. When it is desired to simulate a ground level shell burst on the landscape projected by projector 1, rollers 14 and film 8 are quickly moved towards projector 1 to a position in the focal plane, represented here by the dashed line showing of rollers 14 and film 8 adjacent terrain slide assembly 2. Since the film and shell burst image are now in focus a black shell burst will appear on the projected landscape. The shell burst is not ordinarily visible on the landscape because the image on film 8 is small and is ordinarily in an out-of-focus position. This simulates the gradual dissipation of a burst. Rollers 14 are mounted on a movable frame which moves towards and away from projector 1 in response to actuation of a film moving mechanism 20. Frame and mechanism details are not shown. Film moving mechanism 20 may be a known servomechanism or equivalent. In addition to moving film 8 into and out of focus, film moving mechanism 20 is controlled by computer 26 to shift film 8 in a plane normal to the light beam from projector 1 to move the location of a shell burst on screen 32. A film driving mechanism 25 may be controlled by computer 26 to position a frame of film 8 having several shell burst images thereon in the optical path of projector 1. Details are not shown since computer controlled positioning mechanisms are well known.

When it is desired to show an aerial shell burst, film 8 is moved into focus as is done for ground level bursts. Additionally a projection lamp 16 in a dust cloud projector 18 is turned on, then dimmed gradually and finally extinguished in response to actuation of a lamp control mechanism 22. A light colored dust cloud image on dust cloud film 24 is projected via beam splitter 4 and lens system 6 to appear on the projected landscape immediately underneath the black shell burst image from film 8. As lamp 16 is gradually dimmed the dust cloud image gradually fades away, accurately simulating the dissipation of a dust cloud.

Films 8 and 24 may be driven by a common gear 13 which meshes with drive means for sprockets 12. Gear 13 may be driven by film driving mechanism 25. Film driving mechanism 25, lamp control mechanism 22, and film moving mechanism 20 are controlled by a computer 26. Computer 26 receives information from a terrain memory 28 and a forward observer's position 30. Forward observer's position 30 is shown diagrammatically as a microphone and binoculars to represent the position of an observer who can see the shell bursts and relay instructions to guns and/or planes at one or more other locations.

Computer 26 compares information from position 30 and terrain memory 28 to determine whether a given set of instructions from 30 will result in an air burst or ground burst and determines the size and the location of the burst on the screen 32. Memory 28 stores terrain information, e.g., elevation, for every possible burst location on the landscape. In some cases, depending on azimuth and elevation information relayed from 30, the corresponding information from memory 28 might cause computer 26 to generate a "no visible burst" signal. This would occur if the gun aiming instructions from 30 resulted in a shell burst occurring at a location on the screen which would be obscured from the observer, as for example, by an intervening hill.

A film moving mechanism similar to mechanism 20 is provided for projector 18 to shift film 24 laterally; however, it is not shown in order to minimize the complexity of the drawing. Film driving mechanism 25 moves film 24 as well as film 8 so as to position the dust cloud images correctly with respect to the shell burst images.

The complete apparatus is more complex than shown. Provision is made for synchronized sound effects, the simulation of various type shells or bombs, e.g., with delay fuses, quick fuses, etc. The effects of firing several batteries rather than a single gun may be simulated. Films and reel mechanisms are shown by way of example only. Slides movable in three directions could be used. It is only necessary that the slide be movable to position a transparency having the requisite number of shell bursts or dust clouds in the optical paths of the projectors so as to position the images vertically and laterally on the landscape projection.

Information concerning the topology of the terrain in the scene is stored by any one of a number of conventional techniques such as a magnetic tape digital store. The simulated observer's position with respect to the terrain topology is known. A computer program is used to determine what portions of the topology are visible to the observer from the simulated position. Such information is recorded in the memory for all points on the terrain. When fire on certain coordinates is called for, the computer interrogates the memory to determine the elevation of the coordinate point and whether the point is visible from the observer's simulated position. If the point is visible the memory elevation information is used to position the burst image with respect to the optical axis of the projector. If the point is not visible to the observer, a "do not display" command is given to the projector.

The photograph of the terrain used to make the terrain slide is made from the observer's simulated position on the actual terrain. The camera optical axis is made parallel to a surveyed bearing which is the central axis of the scene. The camera is brought into a precise horizontal position. The optical axis of the camera and therefore the projector is precisely related to the computer terrain memory. Therefore, movements of the burst image can be precisely controlled with respect to the terrain scene.

What is claimed is:

1. In a forward observer trainer for training personnel to observe and direct artillery fire, missiles, bombs and the like, comprising
    a screen,
    a projector having means for projecting a landscape on said screen,
    means for locating a shell burst film in the optical path between said projector and said screen and for traversing said shell burst film so that different shell burst images appear in said optical path,
    said shell burst film being normally positioned out of the focal plane of said projector, and
    means for moving said shell burst film into and out of the focal plane of said projector to superimpose a shell burst image on said projected landscape, whereby personnel can be trained in the firing of artillery pieces, missiles, bombs and the like by observing selectively superimposed shell burst images on a projected landscape.

2. The apparatus of claim 1, and further comprising another projector having film moving means, a dust cloud film bearing light colored dust cloud images thereon, said dust cloud film being positioned in the focal plane of said second projector,
    a lamp in said second projector, said lamp being normally extinguished,
    a lamp control mechanism having means for lighting said lamp to illuminate said dust cloud film to thereby project an image of a dust cloud, and a beam splitter arranged to direct the optical path of both said projectors onto said screen,
    said projectors, films, and beam splitter being positioned with respect to each other and said screen so a to project a dust cloud beneath a shell burst to simulate an aerial burst on said screen.

3. The apparatus of claim 2, said lamp control mechanism including means for gradually extinguishing said lamp to cause said projected dust cloud to appear on said screen and then gradually disappear and thereby simulate the dissipation of the dust cloud caused by a shell burst.

4. The apparatus of claim 3, said film moving means including means for moving said films to position bursts and dust clouds vertically and laterally on said landscape, and computer means connected to control said film moving means and said lamp control mechanism.

* * * * *